Oct. 15, 1935.  C. C. FARMER  2,017,793
FLUID PRESSURE BRAKE
Filed Feb. 10, 1932
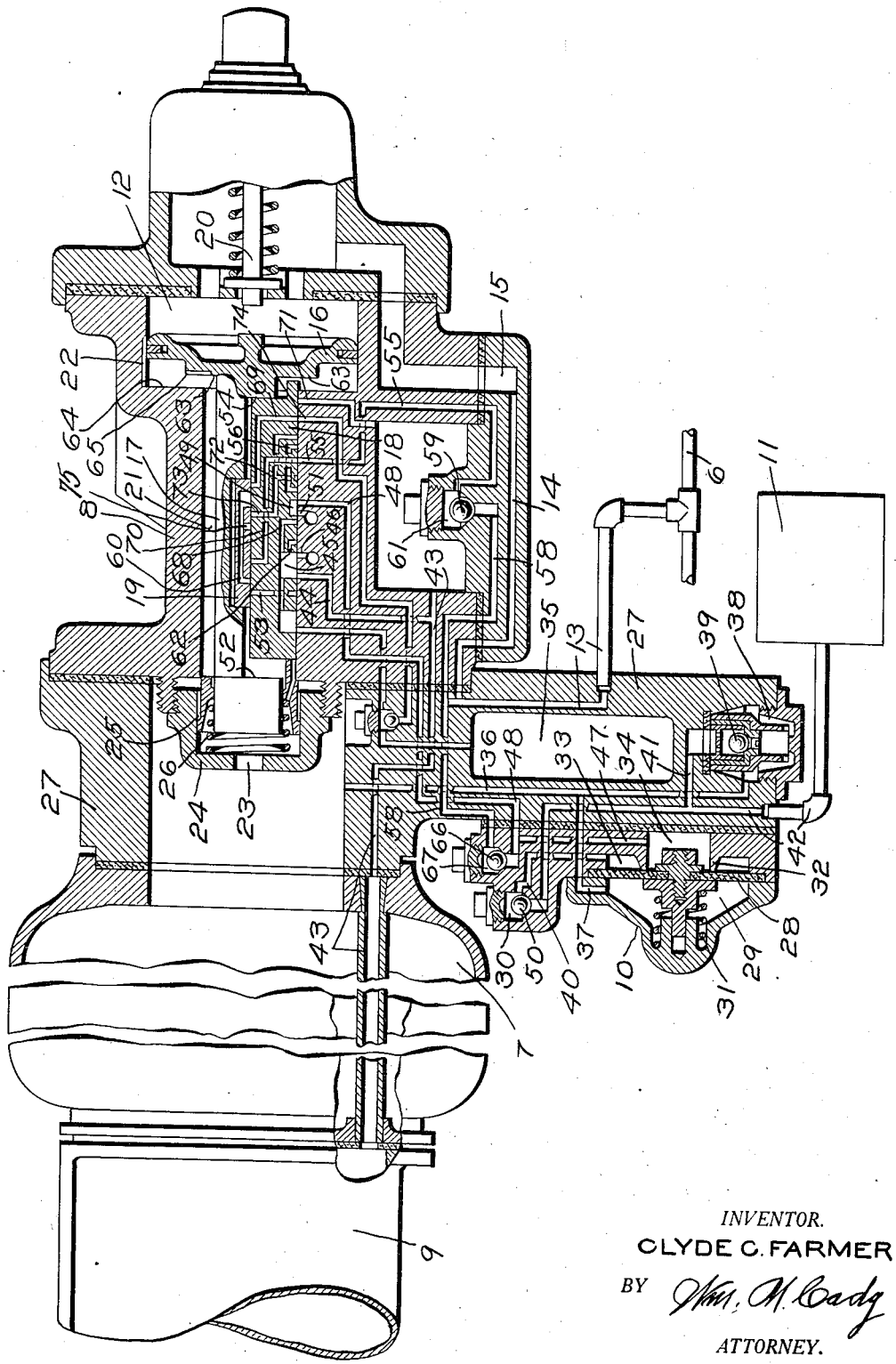
INVENTOR.
CLYDE C. FARMER
BY *Wm. M. Cady*
ATTORNEY.

Patented Oct. 15, 1935

2,017,793

UNITED STATES PATENT OFFICE 2,017,793

FLUID PRESSURE BRAKE

Clyde C. Farmer, Pittsburgh, Pa., assignor to The Westinghouse Air Brake Company, Wilmerding, Pa., a corporation of Pennsylvania Application February 10, 1932, Serial No. 591,940

11 Claims. (Cl. 303—66)

This invention relates to fluid pressure brakes, and more particularly to a brake equipment in which the brakes are applied by effecting a reduction in brake pipe pressure and are released by increasing the brake pipe pressure.

Upon long trains, it is difficult to apply and release the brakes without causing excessive shocks, due to the running in of the slack before the brakes are applied on the rear cars of the train and the running out of the slack before the brakes are released on the rear cars.

In actual service, difficulty in releasing the brakes is experienced, because the brake pipe pressure, when restored entirely from the locomotive, increases so slowly that leakage past the triple valve packing ring prevents the building up of differential pressure sufficient to move the triple valve piston toward release position.

The principal object of the invention is to provide brake equipment by which the brakes can be released on a long train with certainty and without causing excessive shocks. In a copending application, Serial No. 477,076, filed August 22, 1930, by Joseph C. McCune and assigned to the assignee of this application, a brake application and release valve device operative upon reduction in brake pipe pressure, is disclosed which cooperates with a standard triple valve device for effecting serial application and release of the brakes on cars of a train without causing excessive shock.

Another object of the invention is to provide a brake equipment wherein the triple valve device serves to control a valve for effecting serial release activity of the brake equipment, thereby eliminating the pressure responsive valve controlling device employed in the equipment disclosed in the above noted application.

According to this invention, the release is accelerated serially throughout the train, by venting fluid from a normally charged reservoir on each vehicle to the brake pipe, the valve means for controlling the serial release being also controlled by the triple valve device.

These and other objects that will be made apparent throughout the further description of the invention are attained by means of the fluid brake equipment hereinafter described and illustrated in the accompanying drawing; wherein The single figure is a diagrammatic view, mostly in section, of a fluid pressure brake equipment embodying the invention.

Referring to the drawing, the equipment may comprise a brake pipe 6, auxiliary reservoir 7, triple valve device 8, brake cylinder 9, serial release valve device 10 and a serial release reservoir 11.

The triple valve device may be of well known construction and comprises a casing having a chamber 12 connected to the brake pipe 6 through a pipe and passage 13 and passages 14 and 15, and containing a piston 16 having a stem 17 adapted to operatively engage a main slide valve 18 and an auxiliary slide valve 19 contained in a chamber 21 connected to the piston chamber 12 through the usual feed groove 22 around the piston 16 when said piston is in release position and also connected to the auxiliary reservoir 7 through a passage 23 in the threaded nut 24 closing the chamber 21 and containing the retarded release stop sleeve 25 that is subject to the pressure of a spring 26 and which is adapted to be engaged by the left end of the main valve 18. Contained in the piston chamber 12 is a usual spring-pressed graduated stem 20 with which the piston 16 is adapted to engage.

The serial release valve device is contained within a casing or filling piece 27 and may comprise a flexible diaphragm 28, having at one side a chamber 29 containing a spring 31 which urges said diaphragm into engagement with a seat rib 32 at the opposite side of the diaphragm, the seat rib separating an annular chamber 33 from a chamber 34 when the diaphragm is seated. The casing or filling piece also contains a chamber or quick service bulb 35 into which fluid may be vented from the brake pipe in a manner similar to that heretofore proposed in the copending application of Ellis E. Hewitt, Serial No. 545,647, filed June 20, 1931, and assigned to the assignee of this application, for propagating a serial quick service action of the triple valves and a consequent serial application of the brakes on the cars throughout the train. Since the serial quick service activities form no part of the invention claimed herein, a detailed description of the serial quick service application equipment will not be given.

In operation, the brake pipe 6 is charged with fluid under pressure in the usual manner, and fluid flows from the brake pipe through pipe and passage 13, passages 14 and 15 to the piston chamber 12 of the triple valve device 8. Fluid then flows from the piston chamber 12 through the feed groove 22 past the piston 16 to valve chamber 21, and to the auxiliary reservoir 7 through passage 23, thus charging the auxiliary reservoir 7, and the valve chamber 21.

Fluid also flows from the auxiliary reservoir 7 to the chamber 29 of the serial release valve device 10 through passages 36 and 37, and to the serial release reservoir 11 through passage 36, check valve chamber 38, past the ball check valve 39, passage 41 and passage and pipe 42.

With the triple valve device 8 in the release position shown, the brake cylinder 9 is connected to the atmosphere, through pipe and passage 43, passage 44, cavity 45 in the main slide valve 18, and passage 46, and the chamber 34 of the serial release valve device 10 is connected to the atmosphere through passage 47, passage 48, cavity 49 in the main slide valve 18 and passage 51.

This invention is shown in the figure as applied to a triple valve device having quick service equipment for propagating serial quick service action throughout the cars of a train and with respect to this feature of the equipment, is similar to the equipment disclosed in my copending application, Serial No. 484,979, assigned to the assignee of this application. The operation of the improved triple valve device with respect to the serial quick service application features will therefore be but briefly described since those features form no part of the present invention.

When it is desired to effect a service application of the brakes, the brake pipe pressure is gradually reduced in the usual manner. When the brake pipe pressure has been sufficiently reduced in piston chamber 12 of the triple valve device 8, below that in valve chamber 21 on the other side of piston 16, the higher pressure on the auxiliary reservoir side of the piston 16 is able to overcome the friction of said piston and its attached auxiliary slide valve 19 and move the parts to the right until the shoulder 52 on the end of the piston stem 17 strikes against the left end of the main slide valve 18. In this initial quick service position, the auxiliary slide valve 19 uncovers the service port 53 in the slide valve 18.

In this initial movement, the feed groove 22 is closed, so that back flow from the auxiliary reservoir to the brake pipe is prevented.

With the auxiliary valve 19 in initial quick service position, ports 69 and 70 in the main valve are connected by the cavity 60 in the auxiliary valve 19 and register with the passages 55 and 74. Consequently, fluid is locally vented from the brake pipe into the quick service bulb 35, thus effecting a local reduction in brake pipe pressure. This local reduction is rapidly transmitted to the next car of the train, causing the triple valve device on the next car to act in a similar maner and so on throughout the length of the train.

Following the above described quick service venting of fluid from the brake pipe, the triple valve piston 16 and main slide valve 18 are positively moved to service application position on each car, in which position a service port 53 in the main slide valve, which port has been uncovered by the graduating slide valve in its initial movement toward service application position, registers with passage 44 which is open to passage 43 leading to the brake cylinder, so that fluid under pressure is supplied from the auxiliary reservoir 7 to the brake cylinder 9 to effect a service application of the brakes in the usual manner.

When the auxiliary reservoir pressure has been reduced by flow to the brake cylinder to a degree slightly less than the reduced brake pipe pressure, the piston 16 shifts the graduating slide valve 19 back to service lap position, in which position, the supply of fluid to the brake cylinder is cut off.

Upon a further reduction in brake pipe pressure to increase the brake cylinder pressure, the piston 16 moves from lap toward full service position, shifting the graduating slide valve 19 relatively to the main slide valve 18 to a reapplication position. The slide valve 18 is at this time in service position. As the slide valve 19 is thus shifted it uncovers port 53 in the main slide valve and since this port now registers with the passage 44, fluid under pressure is now supplied from the auxiliary reservoir to the brake cylinder. Further, with the auxiliary slide valve 19 in the reapplication position (a position intermediate service lap and full service positions), a port 75 therein which is open to the cavity 60, registers with a port 73 in the main slide valve, which port 73 is open to cavity 72, and the cavity 60 registers with port 69 in the main slide valve which is then in registry with passage 71, so that fluid under pressure is vented from the brake pipe to the brake cylinder to produce a local reduction in brake pipe pressure which is rapidly transmitted to the next car of the train for propagating quick service reapplication action throughout the length of the train.

When the several parts of the triple valve device are in the reapplication position as above described, the reduction in auxiliary reservoir pressure, due to the flow of fluid from this reservoir to the brake cylinder may be such that the triple valve piston, in its traverse toward full service position, will not be moved to full service position, but will be brought to a stop in an intermediate position such as the said reapplication position. When this is the case, the connection from the brake pipe to the brake cylinder is maintained. If, when the triple valve parts are in these positions, and the brake pipe pressure is reduced below brake cylinder pressure, by leakage of fluid from the brake pipe, or by an over reduction in brake pipe pressure, and the triple valve parts do not move promptly to full service position, the check valve 59 will prevent back flow of fluid from the brake cylinder to the brake pipe.

When it is desired to release the brakes, the brake pipe pressure is increased in the usual way by first moving the engineer's brake valve to full release position, which consequently increases the pressure of fluid in piston chamber 12 of the triple valve device 8. On cars at the head end of the train, where the increase is at a rapid rate, the triple valve pistons are moved to the retarded release position.

In the retarded release position, brake cylinder pressure passage 43 is connected through exhaust cavity 45 and the connecting restricted port 62 to the atmospheric exhaust port 46, so that fluid is discharged from the brake cylinder at a restricted rate, in the usual well known manner.

Further, with the triple valve parts in the retarded release position wherein the piston face 63 is in sealing engagement with the shoulder 64 of the valve casing, the flow of fluid under pressure from the brake pipe 6 to the auxiliary reservoir 7 is restricted by the feed groove 65 in the piston, which groove is smaller than the feed groove 22.

It is an object of this invention to obtain a rapid serial release action of all the triple valve devices of the train as a result of movement of the triple valve devices on the cars at the head end of the train to retarded release position. This result is obtained by serially releasing the fluid under pressure stored within the serial release reservoir into the brake pipe when the triple valve parts are in retarded release position.

The venting of fluid from the serial release reservoirs 11 to the brake pipe on the head cars of the train augments the increase in brake pipe pressure due to fluid inflow through the engineer's brake valve, and consequently causes successive movement of the main and auxiliary valves of all triple valve devices on all cars to retarded release position, thereby venting fluid from the serial release reservoirs 11 into the brake pipe, so that all brakes in the train are quickly released. That is to say, the movement of the engineer's brake valve to release position inaugurates serial release action on the front portion of the train after which it perpetuates itself throughout the train.

In accordance with my invention, with the triple valve parts in retarded release position, passages 48 and 55 are connected by the port 56 in the main valve, and fluid under pressure is supplied to the chamber 34 from the brake pipe 6 through pipe and passage 13, passage 58, past the ball check valve 59 in chamber 61, passage 55, passage 56 in the main valve, passage 48, and passage 47.

With the triple valve parts in retarded release position, communication is established between the brake pipe 6 and chamber 34 of the serial release valve 10. As before indicated, the chamber 29 of the serial release valve is in communication with the auxiliary reservoir 7 at all times and the pressure maintained therein is substantially that of the auxiliary reservoir. Consequently, the left face of the diaphragm 28 of the serial release valve is subjected to auxiliary reservoir pressure. Since the annular chamber 33 of the serial release valve is in communication with the serial release reservoir 11, the pressure existing therein is substantially that of the serial release reservoir.

The combined pressures in the chamber 34 on the inner seated area of the diaphragm 28 and the release reservoir pressure acting in the annular chamber 33 are then sufficient to overcome the combined pressures of the auxiliary reservoir pressure acting on the left side of the diaphragm 28 and the pressure of the spring 31, so that the diaphragm 28 is flexed from the seat rib 32, thus permitting venting of fluid under pressure from the serial release reservoir 11 to the brake pipe through the pipe and passage 42 past the ball check valve 50 in the chamber 30, passage 40, annular chamber 33 of the serial release valve device, past the seat rib 32, chamber 34, passage 47, past the ball check valve 66 in chamber 67, passage 58 and passage and pipe 13.

Fluid under pressure continues to flow from the serial release reservoir to the brake pipe until the forces exerted by the spring 31 in the chamber 29 and the auxiliary reservoir pressure within the chamber 29 overcome the forces exerted by the fluid under pressure in the chambers 33 and 34 of the serial release valve device. When this occurs, the diaphragm 28 is moved into sealing engagement with the seat rib 32. The tension of the spring 31 is such that it does not effect closure of the diaphragm upon its seat until the pressure in the serial release reservoir has substantially equalized with that in the brake pipe.

As previously stated, with the triple valve parts in the retarded release position, fluid under pressure is supplied to the auxiliary reservoir 7 from the brake pipe 6 through the feed grooves 22 and 65 at a restricted rate and when the pressure in the auxiliary reservoir is substantially equalized with that in the brake pipe and the chamber 12 of the triple valve device, the stop spring 26 moves the main slide valve 18 and the piston 16 to the full release position shown.

In effecting a release of the brakes, the engineer's brake valve is held in full release position for a short time and then the engineer's brake valve is moved to running positon wherein the brake pipe is supplied in the usual manner with fluid under pressure from the feed valve on the locomotive.

It will be noted that with the triple valve parts in the service application position, communication is established between the chamber 34 of the serial release valve device and the atmosphere through passage 47, passage 48, port 68 in the main slide valve, cavity 45 in the main slide valve and passage 46. Consequently, possible leakage of fluid past the seat rib 32 from the chamber 33, or leakage of fluid from the brake pipe past the ball check valve 66 into the chamber 34 cannot cause opening movement of the diaphragm 28 to supply fluid to the brake pipe and effect an undesirable release of the brakes following a service application thereof.

It will further be noted that the chamber 34 is vented to the atmosphere through the same channel with triple valve parts in the service lap positon.

During the release operation, and when the triple valve parts are in retarded release position, fluid is supplied to the brake pipe through the engineer's brake valve, and fluid is dumped serially into the brake pipe from the release reservoir to facilitate rapid increase in brake pipe pressure throughout the cars of the train in order to initiate release of the brakes on each car as quickly as possible.

It is, therefore, undesirable to discharge fluid from the brake pipe into the release reservoirs after the brake pipe pressure in their vicinity is built up to exceed that of the release reservoirs, since this would delay the build up of brake pipe pressure at the rear cars of the train. The ball check valve 50 is, therefore, provided to prevent the flow of fluid from the brake pipe through the triple valve device and past the open serial release valve device to the serial release reservoir, when the pressure in the brake pipe exceeds that in the serial release reservoir and while the triple valve device is in retarded release position.

The ball check valve 39 is provided to prevent the back flow of fluid under pressure from the serial release reservoid to the auxiliary reservoir when the auxiliary reservoir pressure falls below that of the serial release reservoir. Otherwise, the established balance between auxiliary reservoir and brake cylinder capacity would be altered.

Summarizing, the invention includes the provision in a fluid brake system comprising a brake pipe, triple valve device, brake cylinder, auxiliary reservoir, serial release reservoir, and a serial release valve arranged to effect serial release of the brakes on all cars of the train. The serial release valve for controlling the local delivery of fluid to the brake pipe from the serial release reservoirs throughout the cars of the train is operated in response to pressure differences on opposite sides thereof, and is controlled by the triple valve device.

The increase in brake pipe pressure occasioned by supplying fluid under pressure to the brake pipe through the engineer's brake valve in the usual manner, moves the triple valve devices on the head cars of the train from service lap position, in which the brakes are held applied, to retarded release position wherein a communication is established between the brake pipe and the serial release valve device through which fluid under pressure flows to the serial release valve device and effects opening movement of the pressure operated valve thereof. Opening of the serial release valve establishes communication between the serial release reservoir and the brake pipe through which fluid is rapidly discharged from that reservoir into the brake pipe. The resulting local increase in brake pipe pressure is sufficient to effect movement of the triple valve device on the next succeeding car to retarded release position, wherein local venting of its respective serial release reservoir to the brake pipe is effected in the manner described.

In this manner relative serial movement of the triple valve devices on all cars of the train to retarded release position is obtained and the brakes are released without occasioning severe shock.

The subject matter relating to the feature of back dumping fluid under pressure to the brake pipe after an application of the brakes in order to facilitate the release of the brakes is broadly claimed in my pending applications Serial No. 487,988, filed October 11, 1930, and Serial No. 612,465, filed May 20, 1932.

While but one embodiment of the invention is disclosed, it is obvious that changes, additions and omissions may be made in the construction described without departing from the spirit of the invention.

Having now described my invention, what I claim as new and desire to secure by Letters Patent, is:

1. In a fluid pressure brake, the combination with a brake pipe, of a triple valve device having a valve operated upon a reduction in brake pipe pressure for effecting an application of the brakes and upon an increase in brake pipe pressure for effecting the release of the brakes, of a reservoir normally charged with fluid under pressure, a release valve device operated by brake pipe pressure for supplying fluid from said reservoir to the brake pipe, said valve being operable upon an increase in brake pipe pressure to supply fluid from the brake pipe to said release valve device.

2. In a fluid pressure brake, the combination with a brake pipe, of a triple valve device having a valve operated upon a reduction in brake pipe pressure for effecting an application of the brakes and upon an increase in brake pipe pressure for effecting the release of the brakes, of a reservoir normally charged with fluid under pressure, a valve device subject on one side to fluid under pressure and operated by fluid under pressure supplied to the opposite side to vent fluid from said reservoir to the brake pipe, said valve controlling the supply of fluid from the brake pipe to said opposite side of said valve device.

3. In a fluid pressure brake, the combination with a brake pipe, of a triple valve device having a valve operated upon a reduction in brake pipe pressure for effecting an application of the brakes and upon an increase in brake pipe pressure for effecting the release of the brakes, of a reservoir normally charged with fluid under pressure, a valve device subject on one side to fluid under pressure and operated by fluid under pressure supplied to the opposite side to vent fluid from said reservoir to the brake pipe, said valve being adapted in the retarded release position to supply fluid from the brake pipe to said opposite side of said valve device.

4. In a fluid pressure brake, the combination with a brake pipe, a brake cylinder and a triple valve device having a valve operated upon an increase in brake pipe pressure for releasing fluid from said brake cylinder, of a release reservoir, and valve means, actuated by fluid under a pressure supplied from said brake pipe under the control of said valve, for establishing communication between the release reservoir and the brake pipe.

5. In a fluid pressure brake, the combination with a brake pipe, auxiliary reservoir, brake cylinder, and a triple valve device operated upon a reduction in brake pipe pressure for venting fluid from the auxiliary reservoir to the brake cylinder and upon an increase in brake pipe pressure for releasing fluid from the brake cylinder to the atmosphere, of a release reservoir, valve means subject on one side to auxiliary reservoir pressure and on the opposite side to pressure of said release reservoir and the pressure in a chamber, for controlling communication from the release reservoir to said chamber, and means including the triple valve device for connecting the said chamber to the brake pipe when the triple valve device is in a position for effecting release of the fluid from the brake cylinder to the atmosphere.

6. In a fluid pressure brake, the combination with a brake pipe, a brake cylinder, and a triple valve device having a valve operated upon an increase in brake pipe pressure for releasing fluid from said brake cylinder, of a valve means, actuated by fluid under pressure supplied from said brake pipe under the control of said valve, for controlling a supply of fluid under pressure into the brake pipe.

7. In a fluid pressure brake, the combination with a brake pipe, a brake cylinder, a release reservoir, and a triple valve device having a valve operated upon an increase in brake pipe pressure to release fluid from said brake cylinder, of valve means, actuated in part by fluid under pressure from said release reservoir and in part by fluid under pressure supplied from said brake pipe under the control of said valve, for controlling the supply of fluid under pressure from said release reservoir into said brake pipe.

8. In a fluid pressure brake, the combination with a brake pipe, a brake cylinder, an auxiliary reservoir, a release reservoir and a triple valve device having a valve operated upon an increase in brake pipe pressure for releasing fluid from the brake cylinder, of valve means for establishing communication between the release reservoir and the brake pipe and subject to auxiliary reservoir pressure and to brake pipe pressure, the said valve controlling the supply of fluid under pressure to said valve means from said brake pipe.

9. In a fluid pressure brake, the combination with a brake pipe, a brake cylinder, an auxiliary reservoir, a release reservoir and a triple valve device having a valve operated upon an increase in brake pipe pressure for releasing fluid from the brake cylinder, of valve means for establishing communication between the release reservoir and the brake pipe and subject to auxiliary reservoir pressure and to release reservoir pressure and to brake pipe pressure, the said valve controlling the supply of fluid under pressure to said valve means from said brake pipe.

10. In a fluid pressure brake, the combination with a brake pipe, a brake cylinder, an auxiliary reservoir, a release reservoir and a triple valve device having a valve operated upon an increase in brake pipe pressure for releasing fluid from the brake cylinder, of valve means for establishing communication between the release reservoir and the brake pipe and subject on one side to auxiliary reservoir pressure and on the other side to brake pipe pressure, the said valve controlling the supply of fluid under pressure to said valve means from said brake pipe.

11. In a fluid pressure brake, the combination with a brake pipe, a brake cylinder, an auxiliary reservoir, a release reservoir and a triple valve device having a valve operated upon an increase in brake pipe pressure for releasing fluid from the brake cylinder, of valve means for establishing communication between the release reservoir and the brake pipe and subject on one side to the combined pressure of a spring and auxiliary reservoir pressure and on the other side to the combined release reservoir pressure and brake pipe pressure, said valve controlling the supply of fluid under pressure to said valve means from said brake pipe.

CLYDE C. FARMER.